C. Perley.
Hawse Pipe.

Nº 43,793.     Patented Aug. 9, 1864.

Witnesses:
Lemuel W. Serrell.
Thos. Geo. Harold.

Inventor:
Charles Perley

UNITED STATES PATENT OFFICE.

CHARLES PERLEY, OF NEW YORK, N. Y.

IMPROVED HAWSE-PIPE STOPPER.

Specification forming part of Letters Patent No. 43,793, dated August 9, 1864.

*To all whom it may concern:*

Be it known that I, CHARLES PERLEY, of the city and State of New York, have invented, made, and applied to use a certain new and useful Improvement in Stoppers for Hawse-Pipes; and I do hereby declare the following to be a full, clear, and exact description of the same, reference being had to the annexed drawings, making part of this specification, wherein—

Figure 1:
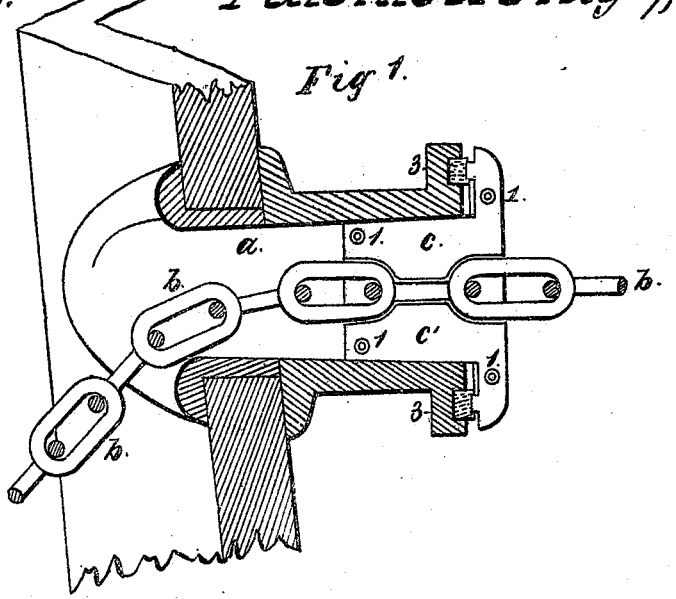
Figure 2:
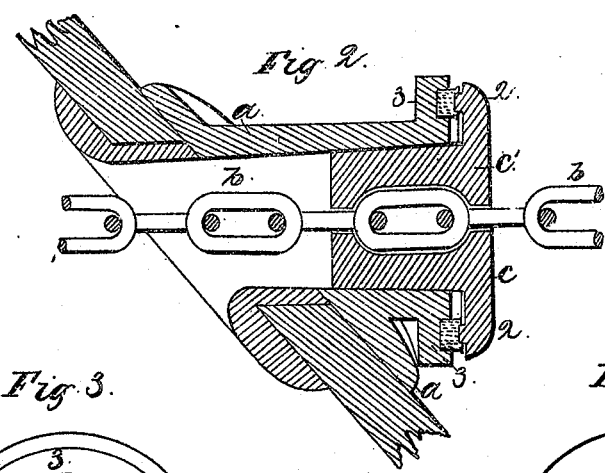
Figure 3:
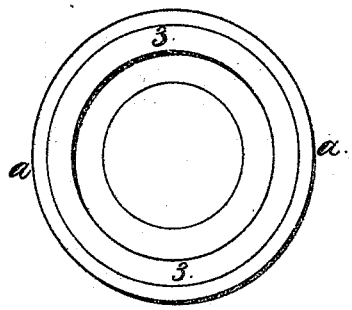
Figure 4:
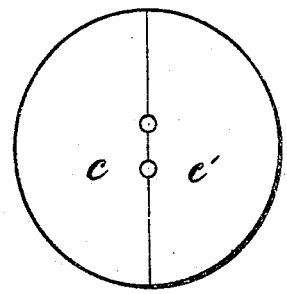

Figure 1 is a section elevation, and Fig. 2 is a sectional plan, of my improvement as applied to a hawse-pipe. Fig. 3 is an end view of said pipe, and Fig. 4 is an elevation of the stopper.

Similar marks of reference denote the same parts.

The nature of my said invention consists in a divided stopper to the hawse-pipe, adapted to receive the chain, so as to close said hawse-pipe water-tight while the chain is through said pipe.

This invention is particularly adapted to "monitors" and vessels of war, in which the hawse pipe is below the water line at the outer end and but little above at the inner end, for my said stopper entirely prevents the ingress of water at the hawse-holes, even when submerged.

My invention is also very useful in any vessel riding at anchor, or in which the chain is constantly through the hawser-pipe, as it prevents water dashing in, keeping the forecastle much drier and warmer than where the hawse-pipe is left open.

In Letters Patent granted to me November 27, 1860, a stopper is shown adapted to a hawse-pipe when the chain is not in the same. The present is an improvement thereon that allows the chain to pass through.

In the drawings, *a* represents the hawse-pipe made in any usual or convenient manner, and attached to the vessel in the well-known way, *b* is the chain cable, and *c c'* is my divided stopper. This stopper should be formed with pins 1 1 in one half entering freely holes in the other half, so as to steady the parts when set together.

In the contiguous faces of the stopper *c c'* recesses are formed of a shape adapted to receive the links of the chain, and the exterior of the stopper is more or less tapering, so as to set within the end of the hawse-pipe, and a flange, 2, is provided around the said stopper taking an annular rubber or other packing at 3. It will now be evident that if the divided stopper is applied to the sides of the chain, and then passed into the end of the hawse-pipe, said pipe will be closed sufficiently tight for ordinary uses; but, if desired, a luting of tallow or similar material may be applied around the chain and between the stopper and the pipe to make the same perfectly water-tight, and if required a bar may be fitted across the stopper with screws to compress it to its place, but ordinarily the weight of chain will be sufficient to hold the stopper to the end of the pipe.

The stopper may be suspended by chains from above so as to be more easily applied to the chain, and this stopper may be used for riding at anchor and dispense with the ordinary riding-bitts. The rubber ring 3, taking the strain on the stopper, prevents its becoming wedged into the hawse-pipe.

This stopper might be employed with any desired character of cable, the opening for the same being properly shaped.

What I claim, and desire to secure by Letters Patent, is—

A divided stopper adapted to receive the cable and fitting into the pipe passing said cable, substantially as specified.

In witness whereof I have hereunto set my signature this 30th day of May, 1864.

CHARLES PERLEY.

Witnesses:
LEMUEL W. SERRELL,
THOS. GEO. HAROLD.